United States Patent
Baehrle-Miller et al.

(10) Patent No.: US 9,031,756 B2
(45) Date of Patent: May 12, 2015

(54) METHOD FOR SETTING THE CLAMPING FORCE APPLIED BY A PARKING BRAKE

(75) Inventors: Frank Baehrle-Miller, Schoenaich (DE); Matthias Schanzenbach, Eberstadt (DE); Tobias Putzer, Bad Friedrichshall (DE); Ulrike Mueller, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/994,878

(22) PCT Filed: Dec. 5, 2011

(86) PCT No.: PCT/EP2011/071772
§ 371 (c)(1),
(2), (4) Date: Aug. 29, 2013

(87) PCT Pub. No.: WO2012/080024
PCT Pub. Date: Jun. 21, 2012

(65) Prior Publication Data
US 2013/0338896 A1    Dec. 19, 2013

(30) Foreign Application Priority Data

Dec. 17, 2010    (DE) .......................... 10 2010 063 345

(51) Int. Cl.
| | |
|---|---|
| *B60T 8/00* | (2006.01) |
| *B60T 8/17* | (2006.01) |
| *B60T 7/04* | (2006.01) |
| *B60T 7/10* | (2006.01) |
| *B60T 13/58* | (2006.01) |
| *B60T 13/74* | (2006.01) |

(52) U.S. Cl.
CPC ................... *B60T 8/17* (2013.01); *B60T 7/042* (2013.01);*B60T 7/045* (2013.01); *B60T 7/107* (2013.01); ;
*B60T 13/588* (2013.01); *B60T 13/741* (2013.01)

(58) Field of Classification Search
USPC .............. 701/70, 34.4, 71, 29.7, 75; 188/158, 188/162, 72.1, 156, 72.6, 106 F; 318/430, 318/362, 432
See application file for complete search history.

(56) References Cited

U.S. PATENT DOCUMENTS

| | | | |
|---|---|---|---|
| 6,311,808 B1 | 11/2001 | Halasy-Wimmer et al. | |
| 7,143,873 B2 * | 12/2006 | Pascucci et al. ............. | 188/72.7 |

(Continued)

FOREIGN PATENT DOCUMENTS

| | | |
|---|---|---|
| DE | 103 61 042 | 5/2005 |
| JP | 2006-82809 | 3/2006 |

(Continued)

OTHER PUBLICATIONS

International Search Report, PCT International Application No. PCT/EP2011/071772, dated May 15, 2012.

*Primary Examiner* — John R Olszewski
*Assistant Examiner* — James M McPherson
(74) *Attorney, Agent, or Firm* — Kenyon & Kenyon LLP

(57) ABSTRACT

In a method for setting the clamping force applied by a parking brake, an electromechanical clamping force portion is set in an electromechanical brake device, and an auxiliary clamping force is set in an auxiliary brake device. A parameter of the electric actuator is regulated to a defined value, while a state variable of the auxiliary brake device, which determines the auxiliary clamping force, is simultaneously set to a setpoint value without feedback control.

23 Claims, 3 Drawing Sheets

(56) References Cited

U.S. PATENT DOCUMENTS

| | | |
|---|---|---|
| 7,227,324 B2 | 6/2007 | Erben et al. |
| 2008/0053760 A1* | 3/2008 | Oikawa et al. ............... 188/72.4 |
| 2008/0196984 A1* | 8/2008 | Leiter et al. .................. 188/167 |
| 2008/0283345 A1* | 11/2008 | Balz et al. .................... 188/72.6 |
| 2009/0133973 A1* | 5/2009 | Shibata ........................ 188/71.3 |
| 2009/0283371 A1* | 11/2009 | Winkler et al. ............. 188/72.6 |
| 2010/0193302 A1* | 8/2010 | Schumann et al. ........... 188/105 |
| 2013/0001027 A1* | 1/2013 | Baehrle-Miller et al. . 188/106 F |

FOREIGN PATENT DOCUMENTS

| | | |
|---|---|---|
| JP | 2010-241389 | 10/2010 |
| WO | WO2011064032 | * 6/2011 |

* cited by examiner

METHOD FOR SETTING THE CLAMPING FORCE APPLIED BY A PARKING BRAKE

FIELD

The present invention relates to a method for setting the clamping force applied by a parking brake in a vehicle.

BACKGROUND INFORMATION

An electromechanical parking brake is described in German Patent No. DE 103 61 042 B3, which has an electric brake motor as an actuator whose rotational movement is converted into an axial actuating movement of a brake piston. The brake piston is the carrier of a brake pad which is pressed against the end face of a brake disk. The amount of clamping force is set by energizing the brake motor.

Electromechanical parking brakes are also described which interact with a hydraulic brake device, whereby the pressure of the hydraulic brake device is applied to the brake piston adjusted by the brake motor. The total clamping force in this case includes an electromotively generated portion and a hydraulically generated portion. When providing the clamping force, a noise development may occur which is caused by the pump motor of the hydraulic brake device which generates the necessary hydraulic pressure.

SUMMARY

An object of the present invention is to provide the necessary clamping force in a parking brake of a vehicle which includes an electromechanical brake device and an auxiliary brake device, using simple measures and maintaining a high level of user comfort.

An example method according to the present invention is used in a parking brake in vehicles, the parking brake being provided with an electromechanical brake device and an activatable brake device. The electromechanical brake device of the parking brake includes an electrically operable actuator which may be used to generate an electromechanical clamping force. To hold the vehicle at a standstill, a clamping force is generated with the aid of the electromechanical brake device.

In addition, the auxiliary brake device may be activated, for example in situations in which the electromechanical clamping force is insufficient to stop the vehicle as safely as necessary. It is also possible to activate the auxiliary brake device to relieve the electromechanical brake device, since the electromechanical portion of the clamping force may be reduced accordingly when the auxiliary brake device is activated.

The electric actuator is preferably an electric brake motor whose rotational movement is converted into an axial actuating movement of a brake piston. The brake piston is the carrier of a brake pad which is pressed against the end face of a brake disk.

In principle, however, another electric actuator for generating the electromechanical clamping force is possible, for example an electromagnetic actuator.

The auxiliary brake device is preferably designed as a hydraulic brake device whose hydraulic pressure is used to generate an additional, supplementary clamping force. For example, the hydraulic pressure may be additionally applied to the brake piston which is adjusted by the electromechanical brake device, so that the total clamping force includes an electromechanical portion and a hydraulic portion.

In generating the electromechanical clamping force, a parameter of the electric actuator is regulated to a defined value; for example, an electric parameter such as the current in the actuator or the force generated by the actuator is regulated. At the same time, the auxiliary clamping force is set to a setpoint value with the aid of an assigned state variable of the auxiliary brake device, without regulation by a feedback loop but solely on the basis of a control without feedback. In the example method according to the present invention, a regulation for the electromechanical brake device and a control of the auxiliary brake device act together. This ensures, on the one hand, a sufficiently accurate setting of a total clamping force which includes an electromechanical portion and a portion of the auxiliary brake device. Regulating the electromechanical brake device allows the total clamping force to be set precisely.

On the other hand, the method may easily be implemented and carried out on the basis of the unregulated control of the auxiliary brake device, since no feedback loop is required for the auxiliary brake device when setting the auxiliary clamping force. The noise development is also reduced, since only a certain, defined level for setting the auxiliary brake device must be reached during the control, which may be achieved without fluctuating or alternative state variables of the auxiliary brake device. In the case of regulation, in contrast, a constantly changing state variable of the auxiliary brake device must be taken into account, which is associated with an unpleasant noise which changes in pitch. In the preferred event that the auxiliary brake device is a hydraulic brake device, in particular the regular vehicle brake, the pump motor of the hydraulic brake device must be regulated at a constantly changing rotational speed during regulation for the purpose of generating the desired hydraulic pressure. In the case of control according to the present invention, in contrast, a certain, defined rotational speed curve is applied to the pump motor, so that continuously changing rotational speeds may be avoided.

Another advantage may be seen in the fact that the risk of a tendency to oscillate due to feedback of the motor current of the electric actuator is ruled out. Conversely, such a tendency to oscillate may be present in parking brakes in which both the electric brake motor and the hydraulic brake device interacting with the brake motor are subjected to regulation. In the design according to the present invention, the pump speed of the hydraulic pump remains at least nearly constant, and the load on the components and vehicle electrical system is reduced.

According to one advantageous embodiment, the current applied to the actuator is regulated as an electric parameter on the part of the electromechanical brake device. To achieve a desired electromechanical clamping force, a certain current level must be applied to the electric actuator. Additionally or alternatively, the regulation takes place with the aid of the clamping force generated by the actuator, in particular in a further phase of the clamping operation.

The auxiliary clamping force generated in the auxiliary brake device is advantageously activated during the clamping operation of the electromechanical brake device. The achievement of a defined value range of a state variable of the actuator may be the trigger for the activation. For example, it is advantageous to use the current which is applied to the electric actuator as a criterion for activating the auxiliary brake device. If the current exceeds a threshold value, support by the auxiliary brake device is requested. The value range for the considered state variable may be either permanently predefined or established as a function of system variables, in particular state variables of the electromechanical brake device and/or the auxiliary brake device.

In addition or as an alternative to the consideration of the current of the electric actuator, the auxiliary support may also be activated upon dropping below a motor speed threshold. In this case, which relates to the use of an electric brake motor in the electromechanical brake device, the risk of the brake motor stopping due to an excessively heavy load may be reduced with the aid of the auxiliary clamping force support.

To control the auxiliary brake device to the desired value of the auxiliary clamping force, a state variable of the auxiliary brake device, which determines the clamping force, is advantageously set to a value which is present as a function or a characteristic curve. For example, the setpoint value of the state variable may be present as a time-dependent or travel-dependent curve, so that the state variable may be set accordingly at the instantaneous point in time or for the instantaneous displacement of the electromechanical actuator. If a hydraulic brake device is used as the auxiliary brake device, the state variable is advantageously the hydraulic pressure which is set to a corresponding setpoint in an unregulated way, following the course of the curve.

The parameters determining the course of the curve for the state variable of the auxiliary brake device may be either permanently predefined or established as a function of other state variables or parameters, in particular they may be dependent on state variables or parameters of the electric actuator. The course of the curve of the setpoint values for the state variable of the auxiliary brake device is designed, for example, as a ramp which ascends up to a defined maximum value. Both the gradient of the ramp and the maximum value represent parameters which are either permanently predefined or established as a function of other variables of the parking brake during ongoing operation. For example, it is possible to adapt the parameters determining the course of the curve in the event of a loss in functional performance or a defect in the electric actuator and/or the auxiliary brake device. For example, if the brake motor as the electric actuator of the electromechanical brake device is unable to provide the requested clamping force, due to a power drop, an adaptation of the setpoint curve for the auxiliary brake device may compensate for the power drop, in particular by raising the gradient in the ramp-like rise and/or by raising the maximum value. Even if a defect occurs in the auxiliary brake device, for example in the design as a hydraulic brake device, if air is present in the hydraulic system, at least a partial compensation of the power drop may be achieved by adapting the parameters of the setpoint characteristic curve.

The example method according to the present invention may run in a regulating or control unit in the vehicle, which may be part of the parking brake system.

Additional advantages and advantageous embodiments are described below and shown in the figures.

DETAILED DESCRIPTION OF EXAMPLE EMBODIMENTS

Figure 1:
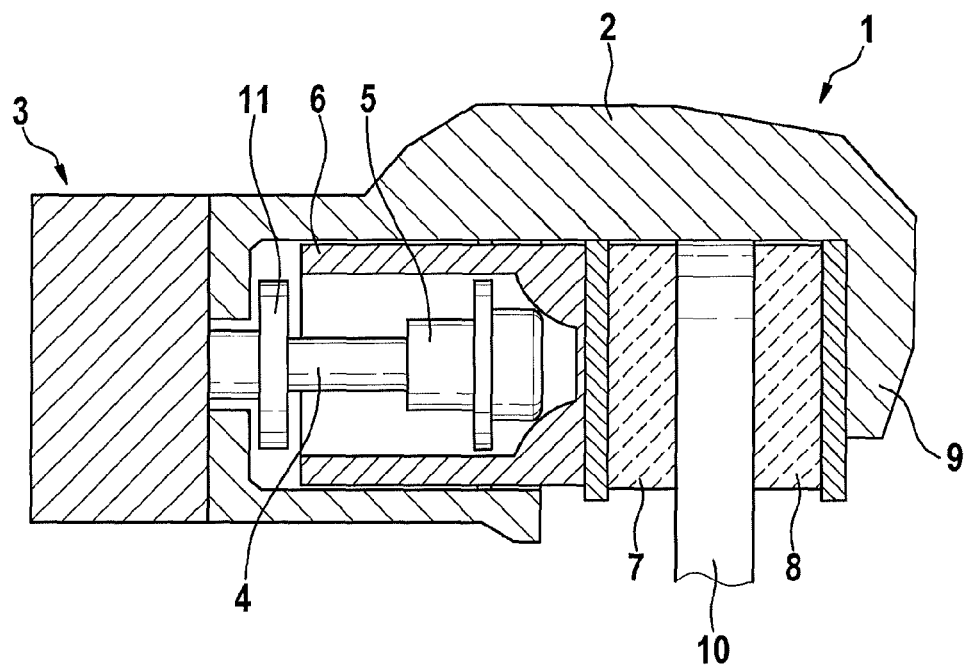
FIG. 1 shows a section of an electromechanical parking brake for a vehicle, in which the clamping force is generated with the aid of an electric brake motor.

FIG. 1 shows an electromechanical parking brake 1 for holding a vehicle at a standstill. Parking brake 1 includes a brake caliper 2 having a clamp 9 which grips a brake disk 10. As the actuator, parking brake 1 has an electric motor as brake motor 3, which rotationally drives a spindle 4 on which a spindle component 5 is rotatably mounted. When spindle 4 rotates, spindle component 5 is axially adjusted. Spindle component 5 moves within a brake piston 6, which is the carrier of a brake pad 7 which is pressed against brake disk 10 by brake piston 6. Another brake pad 8, which is fixedly held in place on clamp 9, is located on the opposite side of brake disk 10.

During a rotational movement of spindle 4, spindle component 5 may move axially forward within brake piston 6 in the direction of brake disk 10 or, in a reversed rotational movement of spindle 4, it may move axially backward until it reaches a stop 11. To generate a clamping force, spindle component 5 strikes the inner end face of brake piston 6, whereby axially movable brake piston 6, which is mounted in parking brake 1, is pressed against the facing end face of brake disk 10 by brake pad 7.

If necessary, the parking brake may be supported by a hydraulic vehicle brake in such a way that the clamping force includes an electromotive portion and a hydraulic portion. During the hydraulic support, pressurized hydraulic fluid is applied to the back of brake piston 6 facing the brake motor.

Figure 2:
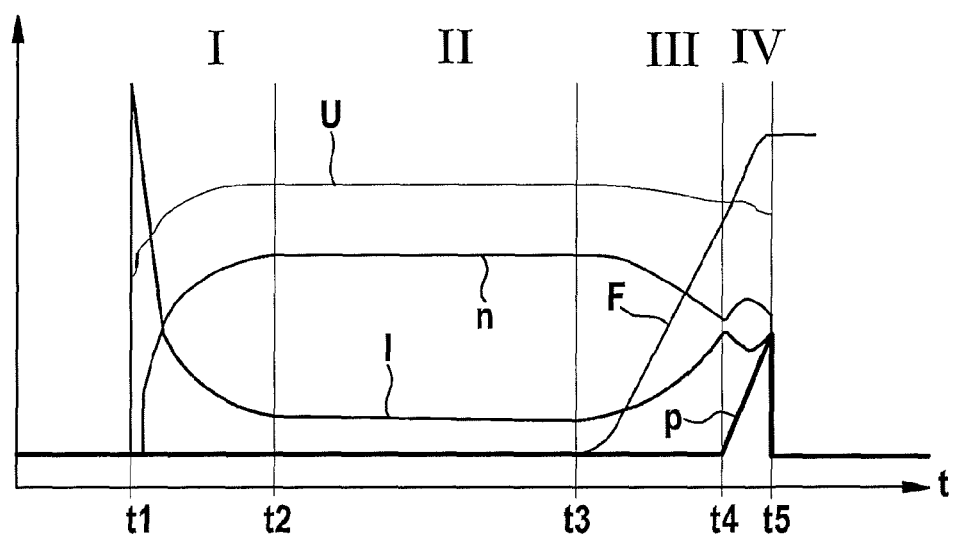
FIG. 2 shows a diagram of the time-dependent curve of the current, the voltage and the motor speed as well as the hydraulic pressure and the total clamping force during a clamping operation of the parking brake.

FIG. 2 shows the time curve of different operating variables of a parking brake during a clamping operation of the brake. The clamping operation may be largely divided into four phases:

At the beginning of a phase I, a clamping request is detected at point in time t1, and electric brake motor 3 is activated. Upon activation of brake motor 3, a starting current peak is detectable. Current I of the brake motor then drops during the further progression until a no-load current sets in at point in time t2 at the end of phase I. Rotational speed n of the brake motor increases during phase I, and the brake motor is accelerated. At the end of phase I, rotational speed n of the brake motor reaches an idling speed at point in time t2. Voltage U of the brake motor also increases, and a no-load voltage sets in at the end of phase I. The rotation of a spindle causes a nut or the spindle component to move in the direction of the brake piston of the wheel brake. Since the nut is not yet in contact with the piston head, clamping force F is initially still zero. Pressure p of a hydraulic pump of the hydraulic brake device is also zero during this phase.

Phase II between points in time t2 and t3 marks the idling phase in which a no-load current, a no-load voltage and an idling speed set in. The clamping force of the wheel brake remains zero during this phase, since the nut is not yet in contact with the piston head. Pressure p in the hydraulic brake device continues to be equal to zero.

The buildup of force takes place in phase III between points in time t3 and t4. The nut is in contact with the piston head, and the piston is pressed against the brake disk by the rotation of the spindle. Current I of the brake motor increases. During this phase, voltage U of the brake motor drops slightly from the level of the no-load voltage, due to the load on the brake motor. Rotational speed n of the brake motor also decreases as the clamping force buildup increases. Shortly before the predefined target clamping force is reached, the hydraulic pump of the hydraulic brake device is activated, and a hydraulic pressure p builds up. The target clamping force may have, for example, a value which is close to the maximum clamping force of the brake motor.

Phase IV between points in time t4 and t5 begins when the target clamping force is reached. During this phase, both brake systems are active, and the electric brake device is supported by the hydraulic brake device. Total clamping force F includes a portion of the electric brake motor and a portion of the hydraulic brake device. Current I of the brake motor is limited to a maximum current in phase IV. Hydraulic brake pressure p continues to increase until a predefined total clamping force has been reached. The brake motor and the pump motor of the hydraulic brake device are then deactivated. As a result, hydraulic pressure p, current I, voltage U and rotational speed n of the brake motor drop to zero. Total clamping force F is maintained in the process.

The hydraulic brake device is not activated again until phase IV, so that the buildup of hydraulic pressure p, which has reached its maximum value at the end of phase IV, i.e., at point in time t5, begins at point in time t4.

However, the point in time of the pressure support by the hydraulic brake device is not absolutely linked to point in time t4, at which phase IV begins. The point in time of the hydraulic support is advantageously established as a function of a parameter of the electric brake motor, in particular the current of the brake motor. For this purpose, a check is carried out to determine whether current I of the brake motor exceeds an assigned threshold value $I_{lim}$. If this is the case, the hydraulic pressure support begins.

Figure 3:
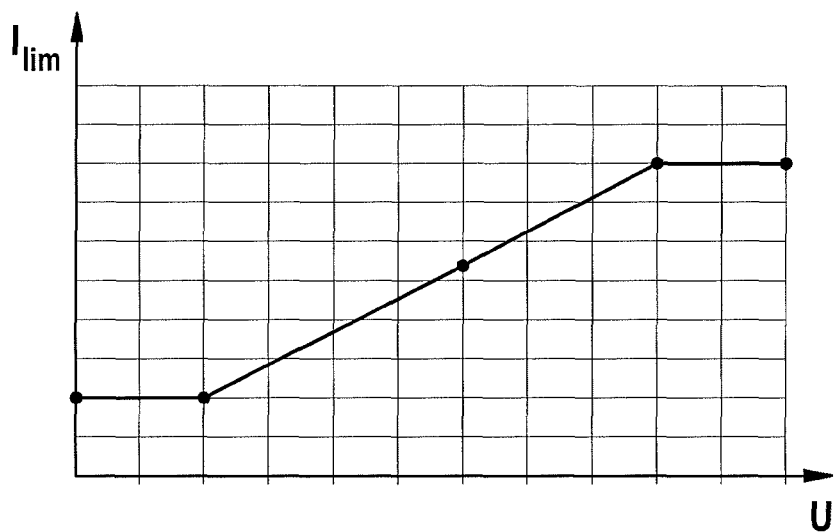
FIG. 3 shows a diagram of the curve of a current threshold value as a function of the voltage.

As shown in FIG. 3, current threshold value $I_{lim}$ may be established as a function of voltage U. Threshold value $I_{lim}$ thus does not represent a constant variable but is adapted as a function of motor voltage U. The function curve according to FIG. 3 is designed as a ramp which reaches a maximum value at a certain voltage value. Due to the adaptation of current threshold value $I_{lim}$, the triggering of phase IV may be adapted to the operating conditions of the brake motor. The adaptation of the threshold value is necessary, since the maximum possible motor current decreases proportionately to the motor voltage, and the maximum possible motor torque in the parking brake is thus also available only to a reduced degree.

However, it is also possible, in principle, to predefine current threshold value $I_{lim}$ as a fixed, constant variable.

Figure 4:
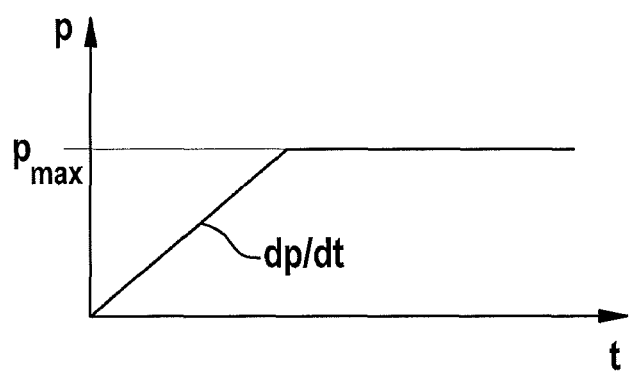
FIG. 4 shows a diagram of the curve of the setpoint pressure for the hydraulic brake device as a function of time.

FIG. 4 shows the pressure curve of hydraulic pressure p as a function of time. The pressure curve is predefined as a setpoint curve for setting the hydraulic brake device. The setting is carried out only in a controlled way without a feedback loop; only a parameter of the electric brake motor is regulated to a setpoint value. The regulation of the brake motor is carried out with the aid of the current in phase III. In phase IV, in contrast, the force generated by the brake motor is regulated with the aid of the distance traveled and the rigidity of the brake caliper.

As shown in FIG. 4, the setpoint curve of pressure p is designed as a ramp with a gradient dp/dt, which reaches its maximum value at $p_{max}$. Gradient dp/dt as well as maximum value $p_{max}$ represent parameters which are either permanently predefined or are determined as a function of state variables or parameters of the electromechanical brake device and/or of the hydraulic brake device. For example, a higher gradient and a higher maximum value may be selected over the course of setpoint curve p, if a power loss occurs in the electromechanical brake device.

Figure 5:
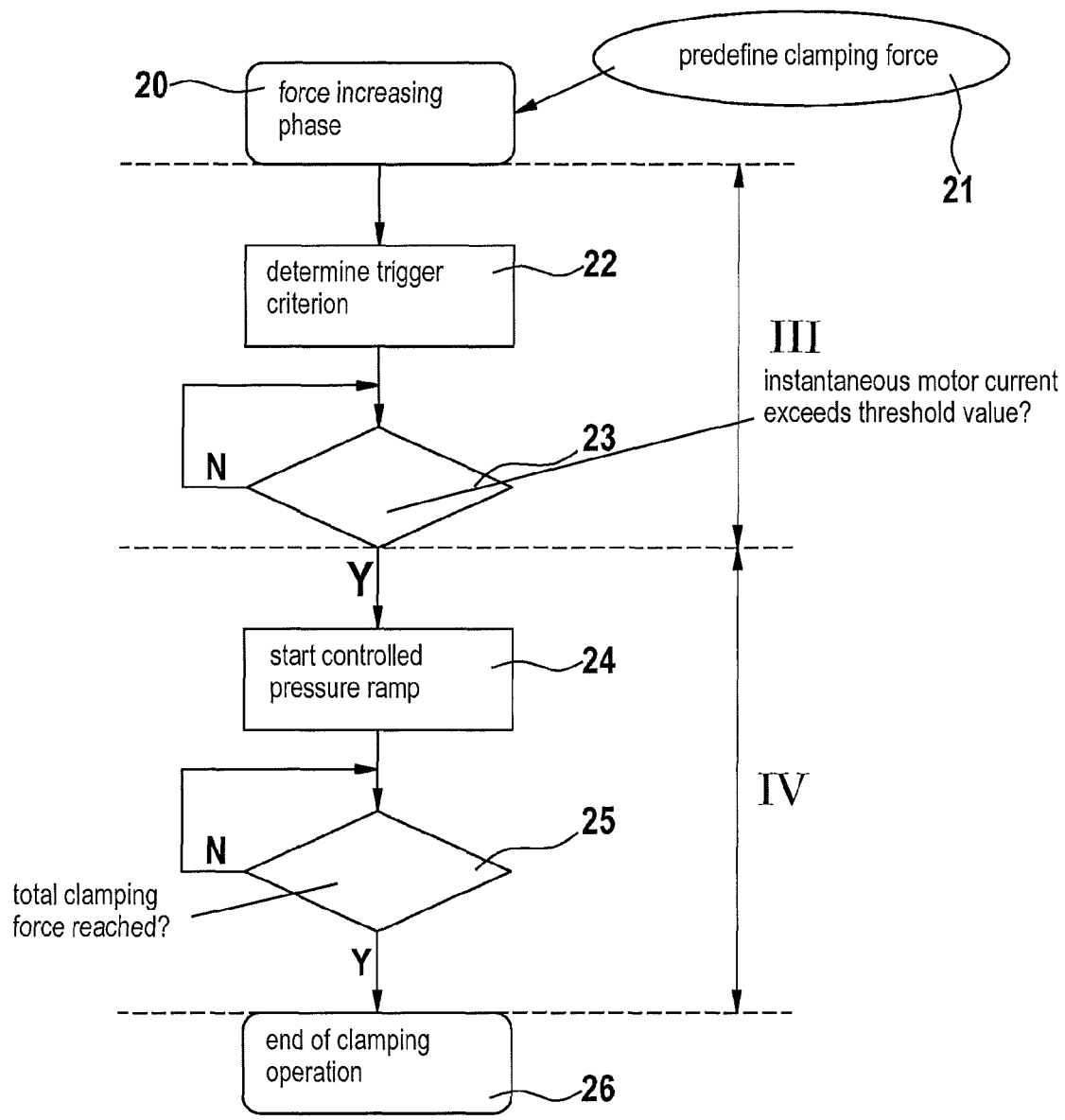
FIG. 5 shows a flow chart of the individual method steps for carrying out the method for setting the parking brake.

FIG. 5 shows a flow chart of individual method steps for setting the total clamping force in the parking brake. The flow chart begins in force increasing phase 3 at point in time t3 according to first method step 20. Step 21 is used to predefine a clamping force as the target clamping force, which may be used to hold the vehicle in place on an inclined surface having a 30% gradient.

Further method steps 22 and 23 correspond to force increasing phase III. According to step 22, the trigger criterion for starting the hydraulic clamping force support is ascertained. For this purpose, current threshold value $I_{lim}$ is determined according to the context illustrated in FIG. 3. A query of whether instantaneous motor current I exceeds current threshold value $I_{lim}$ is carried out in subsequent method step 23. If this is not the case, the method goes back, following the no branch ("N"), and another check of whether motor current I has exceeded threshold value $I_{lim}$ is carried out at regular intervals.

When motor current I exceeds threshold value $I_{lim}$, the method follows the yes branch ("Y") to next method step 24, which, along with subsequent method step 25, is assigned to phase IV (FIG. 2). In method step 24, a controlled pressure ramp is started according to the diagram shown in FIG. 4, and the hydraulic pressure in the hydraulic brake device is increased according to the predefined ramp function shown in FIG. 4. In next step 25, a query is carried out of whether the total clamping force, which includes the electromotive portion and the hydraulic portion, has been reached. If this is not the case, the method follows the no branch back to the query, and the query is restarted at regular intervals. However, if the total clamping force is reached, the method follows the yes branch to next method step 26, which marks the end of the clamping operation in the parking brake. Point in time t5 (FIG. 2) is reached in method step 26.

What is claimed is:

1. A method for setting a clamping force applied by a parking brake, the method comprising:
   regulating, by a control unit, a first parameter of the electric actuator to a defined value, wherein regulation of the parameter occurs while an auxiliary clamping force is generated by the parking brake, wherein the parking brake includes an electromechanical brake device having an electric actuator for generating an electromechanical clamping force, and an auxiliary brake device which is additionally activated for generating the auxiliary clamping force; and
   simultaneously setting, by the control unit, a first state variable of the auxiliary brake device which determines the auxiliary clamping force to a setpoint value without feedback control;
   wherein the auxiliary clamping force of the auxiliary brake device is activated by the control unit when the state variable of the actuator lies outside a defined value range.

2. The method as recited in claim 1, wherein current applied to the actuator is regulated as the parameter.

3. The method as recited in claim 1, wherein the clamping force generated by the actuator is regulated as the parameter.

4. The method as recited in claim 1, wherein the auxiliary clamping force of the auxiliary brake device is activated when the parameter of the actuator to be regulated or a variable correlating therewith exceeds a threshold value.

5. The method as recited in claim 1, wherein the state variable of the auxiliary brake device is provided as a time-dependent curve, wherein the time-dependent curve is determined by a plurality of elements, and a value of the state variable corresponding to an instantaneous point in time is set.

6. The method as recited in claim 5, wherein at least one element determining the time-dependent curve is permanently predefined.

7. The method as recited in claim 5, wherein at least one element determining the time-dependent curve is determined as a function of at least one of the first or another parameter of the electric actuator or at least one state variable of the electric actuator.

8. The method as recited in claim 7, wherein the at least one element determining the time-dependent curve is adapted to compensate and maintain the clamping force in the event of a loss in functional performance or a defect in at least one of the electric actuator and the auxiliary brake device.

9. The method as recited in claim 1, wherein the state variable of the auxiliary brake device has a ramp-like increase until a maximum value is reached.

10. The method as recited in claim 1, wherein the auxiliary brake device is a hydraulic vehicle brake, and the state variable is a hydraulic pressure.

11. The method as recited in claim 1, wherein the electric actuator of the electromechanical brake device includes an electric brake motor whose rotational speed is regulated with the aid of current applied to the electric actuator.

12. A regulating or control unit for setting a clamping force applied by a parking brake, comprising:
a regulating or control unit for setting a clamping force applied by a parking brake, which includes a electromechanical brake device and an auxiliary brake device, the parking brake having an electric actuator for generating an electromechanical clamping force, and being additionally activatable for generating an auxiliary clamping force, the unit configured to regulate a parameter of the electric actuator to a defined value while clamping force is generated by the parking brake, and simultaneously set a state variable of the auxiliary braking device which determines the auxiliary clamping force to a setpoint value without feedback control;
wherein the auxiliary clamping force of the auxiliary brake device is activated by the control unit when the state variable of the actuator lies outside a defined value range.

13. A parking brake in a vehicle, comprising:
an electromechanical brake device having an electric actuator for generating an electromechanical clamping force;
an auxiliary brake device which is additionally activated for generating an auxiliary clamping force; and
a regulating or control unit for setting a clamping force applied by a parking brake including the electromechanical brake device and the auxiliary brake device, the unit configured to regulate a parameter of the electric actuator to a defined value while clamping force is generated by the parking brake, and simultaneously set a state variable of the auxiliary braking device which determines the auxiliary clamping force to a setpoint value without feedback control;
wherein the auxiliary clamping force of the auxiliary brake device is activated by the control unit when the state variable of the actuator lies outside a defined value range.

14. The regulating or control unit as recited in claim 12, wherein current applied to the actuator is regulated as the parameter.

15. The regulating or control unit as recited in claim 12, wherein the clamping force generated by the actuator is regulated as the parameter.

16. The regulating or control unit as recited in claim 12, wherein the electric actuator of the electromechanical brake device includes an electric brake motor whose rotational speed is regulated with the aid of current applied to the electric actuator.

17. The regulating or control unit as recited in claim 12, wherein the auxiliary clamping force of the auxiliary brake device is activated when the parameter of the actuator to be regulated or a variable correlating therewith exceeds a threshold value.

18. The regulating or control unit as recited in claim 12, wherein the state variable of the auxiliary brake device is provided as a time-dependent curve, wherein the time-dependent curve is determined by a plurality of elements, and a value of the state variable corresponding to an instantaneous point in time is set.

19. The regulating or control unit as recited in claim 18, wherein at least one element determining the time-dependent curve is permanently predefined.

20. The regulating or control unit as recited in claim 18, wherein at least one element determining the time-dependent curve is determined as a function of at least one of the first or another parameter of the electric actuator or at least one state variable of the electric actuator.

21. The regulating or control unit as recited in claim 20, wherein the at least one element determining the time-dependent curve is adapted to compensate and maintain the clamping force in the event of a loss in functional performance or a defect in at least one of the electric actuator and the auxiliary brake device.

22. The regulating or control unit as recited in claim 12, wherein the state variable of the auxiliary brake device has a ramp-like increase until a maximum value is reached.

23. The regulating or control unit as recited in claim 12, wherein the auxiliary brake device is a hydraulic vehicle brake, and the state variable is a hydraulic pressure.

* * * * *